United States Patent [19]

Veale

[11] 4,353,020
[45] Oct. 5, 1982

[54] IMPACT PRINTER PROGRAMMED SERVO SYSTEM

[75] Inventor: John R. Veale, Manhattan Beach, Calif.

[73] Assignee: Plessey Peripheral Systems, Irvine, Calif.

[21] Appl. No.: 956,735

[22] Filed: Nov. 1, 1978

[51] Int. Cl.³ ............................................. G05B 19/28
[52] U.S. Cl. .................................... 318/601; 318/603; 318/618
[58] Field of Search ............... 318/373, 603, 601, 618, 318/341; 364/444

[56] References Cited

U.S. PATENT DOCUMENTS

| | | | |
|---|---|---|---|
| 2,932,471 | 4/1960 | Exner et al. | 364/444 X |
| 3,248,622 | 4/1966 | Kelling | 318/601 X |
| 3,458,785 | 7/1969 | Sordello | 318/601 X |
| 3,559,018 | 1/1971 | Fournier | 318/618 |
| 3,737,751 | 6/1973 | Lima | 318/373 |
| 4,066,941 | 1/1978 | Foster | 318/603 |
| 4,226,546 | 10/1980 | Hoffman | 318/341 |

OTHER PUBLICATIONS

Electric Motor Control Techniques, by Irving Gottlieb, pp. 132, 129, (1976), Thomas W. Sams publication.

Primary Examiner—B. Dobeck
Attorney, Agent, or Firm—Knobbe, Martens, Olson, Hubbard & Bear

[57] ABSTRACT

A positioning control servo uses a digital feedback control system and an analog feedback control system, both simultaneously generating control signals to a servo summing node. The digital system derives negative feedback from velocity values which are raised to any programmed exponential value according to a linear velocity profile. The analog system feedback signals provide a non-linear velocity profile and fine position adjustment and dominates control at the servo end of travel. Interface control is provided from multiplexing a single digital feedback control system with a plurality of servo systems. The interface control selects a unique velocity profile in a digital system for each particular servo system. No switching is required between the digital and analog systems because both have continuous input to the servo summing node.

23 Claims, 12 Drawing Figures

| DIGITAL POSITION ERROR | 100 | 95 | 50 | 23 | 3 | 2 | 1 | 0 |
|---|---|---|---|---|---|---|---|---|
| ANALOG POSITION ERROR (VOLTS) |  |  |  | 1/2 | 1/2 | 1/2 | 1/2 | 1/2 |
|  |  |  |  | -1/2 | -1/2 | -1/2 | -1/2 | -1/2 |
| ANALOG VELOCITY (VOLTS) | 0 | -3 | -3 | -3 | -3 | -2.8 | -1.8 | -.6 |
|  |  |  |  |  | -2.8 | -1.8 | -.6 | 0 |
| DIGITAL VELOCITY (VOLTS) | 0 | -10 | -20 | -20 | -1 | 0 | 0 | 0 |
|  |  |  |  | -20 |  |  |  |  |
| SUM (VOLTS) | 100 | 82 | 27 | 1/2 | -1/2 | 0 | 0 | 0 |
|  |  |  |  | -1/2 | -.3 | -.3 | -.1 | -.1 |
| MOTOR VOLTAGE | 10 | 10 | 10 | 5 | -5 | -3 | -1 | -1 |
|  |  |  |  | -5 | -3 | -3 | -1 | -1 |

IMPACT PRINTER PROGRAMMED SERVO SYSTEM

BACKGROUND OF THE INVENTION

High speed printers typically require positioning servo feedback control systems for controlling the position of the print head, a printing mechanism such as a daisy wheel, the ribbon, and the paper platen. Control systems which are used in high-speed, true-font, moving-head, stop-to-print printers must have the ability to move each of these elements at a high speed from one position to another precise position and critically damp the motion near its end of travel. Such positioning control systems are useful for moving the devices at a high rate of speed between two precisely defined points. Therefore, such control systems are distinguished from mere velocity control servo systems because velocity control servo systems, such as those used to control tape speed in a tape recorder, merely control the velocity of the tape to a desired constant value, and are not concerned with the position of the tape.

Positioning feedback control systems typically operate a servo mechanism by accepting an input defining a commanded position of the servo mechanism, computing a position error from the difference between the commanded position and the actual position of the servo, and subtracting from this computed position error the sensed velocity of the servo mechanism. These control systems are concerned primarily with reaching the commanded position in the shortest possible time without overshooting the commanded position at the end of travel. The time of travel may be optimally minimized by selecting a velocity profile of a particular shape. Specifically, it has been found that linear velocity profiles of the servo are preferable.

However, just prior to bringing the servo motion to a complete stop, an exponential or non-linear velocity profile is preferable as the velocity of the servo approaches zero at its end of travel. It is well known that a velocity feedback in the feedback control system which is proportional to the square of the velocity yields a linear velocity profile during deceleration. Depending upon the characteristics of the hardware and the servo mechanism, the most desirable exponent of the velocity might be a number different from two.

It is well known that in analog feedback control systems, it is very difficult to obtain velocity feedback which is proportional to the square of the velocity, and it is nearly impossible to obtain velocity feedback which is proportional to velocity raised to a power slightly different from two.

Despite these disadvantages of analog feedback control systems, the substitution of a digital feedback control system in place of an analog control system results in a loss in the advantages which are inherent in an analog feedback control system. Such advantages include the continuous nature of the control exercised by the analog system over the servo mechanism and also the inherent ability of the analog system to generate an exponential deceleration near the end of servo travel due to the naturally linear velocity feedback of the analog control system.

In the prior art, combination of both a digital control system and an analog control system in one position servo control system has necessitated the use of additional control devices to permit both the digital and the analog control systems to interface with the same servo system. For example, a switch which switches the servo between the analog system and the digital system has been thought to be necessary.

SUMMARY OF THE INVENTION

This invention solves the problems of the prior art associated with positioning control systems for high-speed, true-font, moving-head, stop-to-print printers. In the invention, both an analog feedback control system and a digital feedback control system are used to control a position servo mechanism without any additional control devices for switching the servo mechanism between analog control and digital control. Instead, both the analog control system and the digital control system simultaneously and continuously input data to the servo summing node for generating control commands to the servo mechanism. The digital control system provides coarse position control of the servo mechanism while the servo mechanism is relatively far from its commanded position, and the analog control system provides very fine positioning control of the servo mechanism when the servo mechanism is near its commanded position.

The analog system causes the servo mechanism movement to be critically damped at the end of travel. Because the analog system is especially adapted to very fine positioning measurements, it is saturated by large position errors and the digital control system therefore dominates when the servo mechanism is relatively far from its commanded position. As the servo mechanism is commanded by the digital control system to move toward its commanded position, the position error becomes less and less until it finally falls below a minimum value, and the digital positioning system can no longer sense the error due to its coarse sensitivity. The digital system therefore ceases to issue a control command to the servo mechanism despite the fact that the servo mechanism has not reached its end of travel. The same sequence occurs for sensed velocity. Therefore, the analog control system assumes exclusive control of the servo mechanism.

Thus, it is seen that the analog system dominates near the end of travel of the servo mechanism. The control of the servo mechanism therefore passes from the digital system to the analog system as the servo mechanism approaches its destination. The transition region in which the changing control takes place may selectively be chosen to correspond to any segment of servo mechanism travel. Furthermore, the transition between analog velocity control and digital velocity control may selectively occur at a separate point from the transition between analog position control and digital position control.

Both the digital control system and the analog control system are typical position control systems in which the magnitude of the command signal which drives the servo mechanism is calculated by determining the difference between the commanded position and the actual position of the servo mechanism and by subtracting from this difference the actual sensed velocity of the servo mechanism. The result of this calculation is used to generate a voltage signal which typically drives an electric motor or other electromagnetic device. The magnitude of this voltage determines the forces of the motor applied to the controlled device.

The digital system provides a velocity profile during deceleration of the servo mechanism which is of any desired profile, although in the preferred embodiment of this invention the profile is linear. This is accomplished by using a read only memory with a look-up table of numbers which are addressed by the inverse of the sensed velocity. The numbers supplied by the read only memory are used as the velocity feedback in the digital control system. The look-up table may be selected to give any velocity profile desired. In the preferred embodiment of this invention, a look-up table supplies numbers which are roughly proportional to the square of the velocity in order to force the digital control system to provide a linear or straight line velocity profile during deceleration control by the digital control system.

Further adjustment of the velocity profile is provided in this invention by modifying the address supplied to the read only memory containing the velocity look-up table. This is accomplished as follows: the velocity look-up table is addressed by the inverse of the sensed velocity. This inverse is defined by the contents of a velocity register which is periodically incremented by an arithmetic logic unit. The contents of this register are dumped as an address to the velocity look-up table read only memory each time a digital position bit occurs. In order to adjust the velocity profile provided to the velocity read only memory, the constant rate at which the arithmetic logic unit increments the velocity register may be selected from a second read only memory. This second read only memory is conveniently addressed by the hardware address of the servo hardware being serviced by the digital control system. As a result, a different hardware address will result in a different address being furnished to the velocity look-up table read only memory for a given actual sensed velocity of the servo mechanism, resulting in adaptation of the velocity profile generated by the digital control system to individual servo mechanism characteristics.

The analog control system provides very fine positioning control near the end of travel of the servo mechanism because the analog control system inherently provides continuous control as the position of the servo mechanism changes. Furthermore, because the analog control system dominates only near the end of travel of the servo mechanism as it approaches its commanded position, the analog system may be used to provide the desired non-linear velocity profile as the servo mechanism approaches its end of travel. The analog system has a particular advantage in this regard because it naturally provides a velocity feedback to the servo summing node which is linearly proportional to sensed velocity. It is well known that velocity feedback which is linearly proportional to sensed velocity provides a non-linear velocity profile during deceleration.

The digital system easily lends itself to multiplexing the use of the digital control system between a number of servo systems, each of which may have different control characteristics and require different response characteristics from the digital control system. It has already been seen that the digital control system provides a read only memory addressed by a hardware address for adapting the velocity profile to individual servo mechanisms. In addition, the digital system may be multiplexed or time-shared many times between changes in digital position, among a plurality of servo mechanisms. This results in an efficient time sharing use of the digital system between several servo systems. The utility of this feature is especially advantageous in a high speed printer, because a printer includes three or more separate servos, including a servo for moving the printing head, a servo for moving the carriage, and a servo for moving the paper platen. Because all these servo mechanisms must be coordinated in their movement, the use of a single digital servo system multiplexing its control between all three servo systems provides convenient coordination of the control of these servo systems and also reduces the cost of the printer by eliminating the need for a separate digital control system for each servo system of the printer.

DESCRIPTION OF FIGURES

The invention is best understood by reference to the accompanying drawings, of which:

FIG. 4 illustrates the time domain wave forms generated by the digital control system and the analog control system of FIG. 3 and, in particular.

DETAILED DESCRIPTION

Figure 1:
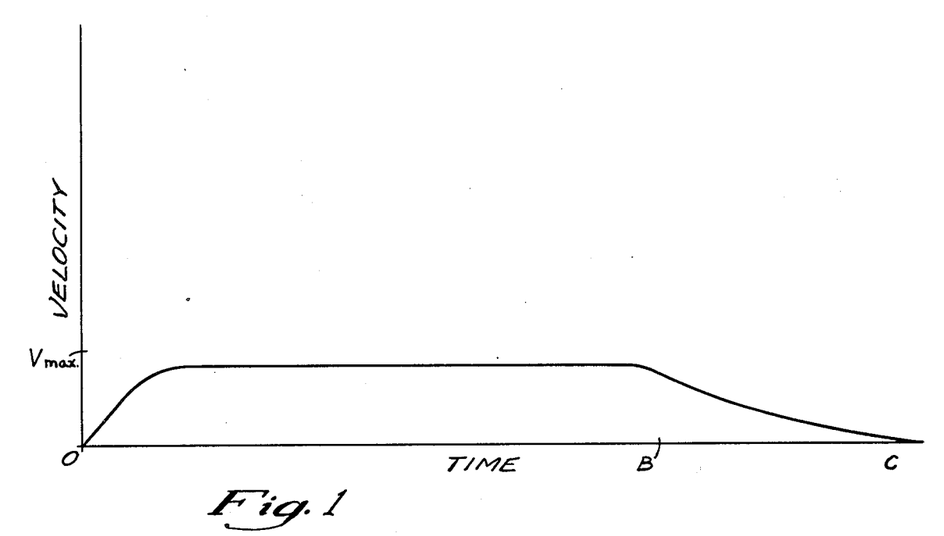
FIG. 1 is a plot of the velocity as a function of time of a servo mechanism controlled by a positioning control system having velocity feedback, showing a preferred velocity profile during deceleration of the servo mechanism motion.

FIG. 1 illustrates the velocity as a function of time of a servo mechanism controlled by a positioning feedback control system. Such a control system generates a voltage to drive the servo mechanism which is proportional to the magnitude of a position command signal supplied to the control system. The magnitude of the actual position of the servo mechanism and the magnitude of the actual velocity of the servo mechanism are subtracted as negative feedback signals from the magnitude of the commanded position by the control system at a servo summing node. The voltage appearing at the servo summing node may be passed through an amplifier having a particular gain, and the output of the amplifier may be used as a voltage driving the servo mechanism motor. The torque of the motor is directly proportional to that voltage. It may be seen that if the magnitude of the commanded position signal in volts is designated CP, the magnitude of the actual position of the servo mechanism in volts is designated AP, the magnitude of the actual velocity of the servo mechanism in volts designated AV, and the gain of the amplifier designated G, the voltage V is supplied to the motor by the control system as given by the following equation:

$$V = (CP - AP - AV) \times G.$$

Figure 2:
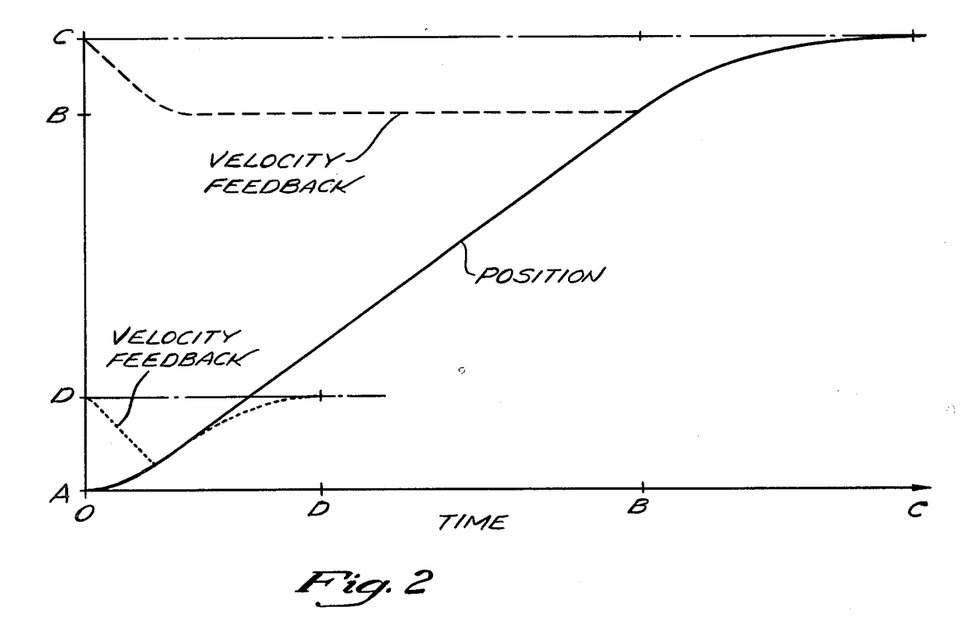
FIG. 2 is a plot of the position as a function of time of a servo mechanism controlled by a positioning control system, corresponding to the velocity plotted as a function of time in the graph of FIG. 1.

In FIG. 1, it is desired to move the position of the device driven by the motor from position A at time zero to position C at time C at a maximum velocity of $V_{max}$. At time 0, the velocity is 0 and it begins to increase at a linear rate until it reaches $V_{max}$. The velocity plotted in FIG. 1 climbs at a steady rate which is limited by the maximum current output of the control system and by the back EMF of the servo mechanism. This steady acceleration is terminated when the velocity reaches the $V_{max}$. Deceleration begins at position B, which corresponds to time B in the graph of FIG. 1. The deceleration beginning at position B has a straight line or linear profile, although it terminates in a non-linear or exponential profile as the velocity approaches zero at time C and position C. Turning to FIG. 2, the corresponding position error of the servo mechanism as a function of time is clearly shown in which the slope of the position error curve is generally constant until time B, corresponding to position B. From time B to time C, the position error curve is exponential or non-linear.

The dashed line of FIG. 2 corresponds to an inverted plot of the magnitude of the negative velocity feedback of the positioning control system, discussed above. As previously described, the voltage at the summing node is the result of subtracting actual velocity from position error. The negative velocity feedback is equal to the position error feedback at time B corresponding to position B where the position error and velocity curves intersect in FIG. 2. As a consequence, it is at time B that the deceleration of the servo mechanism is begun, and the negative velocity feedback follows the plot of the position error feedback between times B and time C.

Another event is illustrated by the dotted lines of FIGS. 1 and 2 corresponding to a controlled movement of the servo mechanism along the shorter distance between the positions A and D. The distance between position A and position D is so short that the control system never reaches its maximum velocity $V_{max}$, and therefore there is no time at which the velocity is constant. Instead, at the relatively early time E, the velocity curve intersects the position error curve as illustrated in FIG. 2, which causes the control system to discontinue acceleration of the servo mechanism and begin deceleration.

Figure 3:
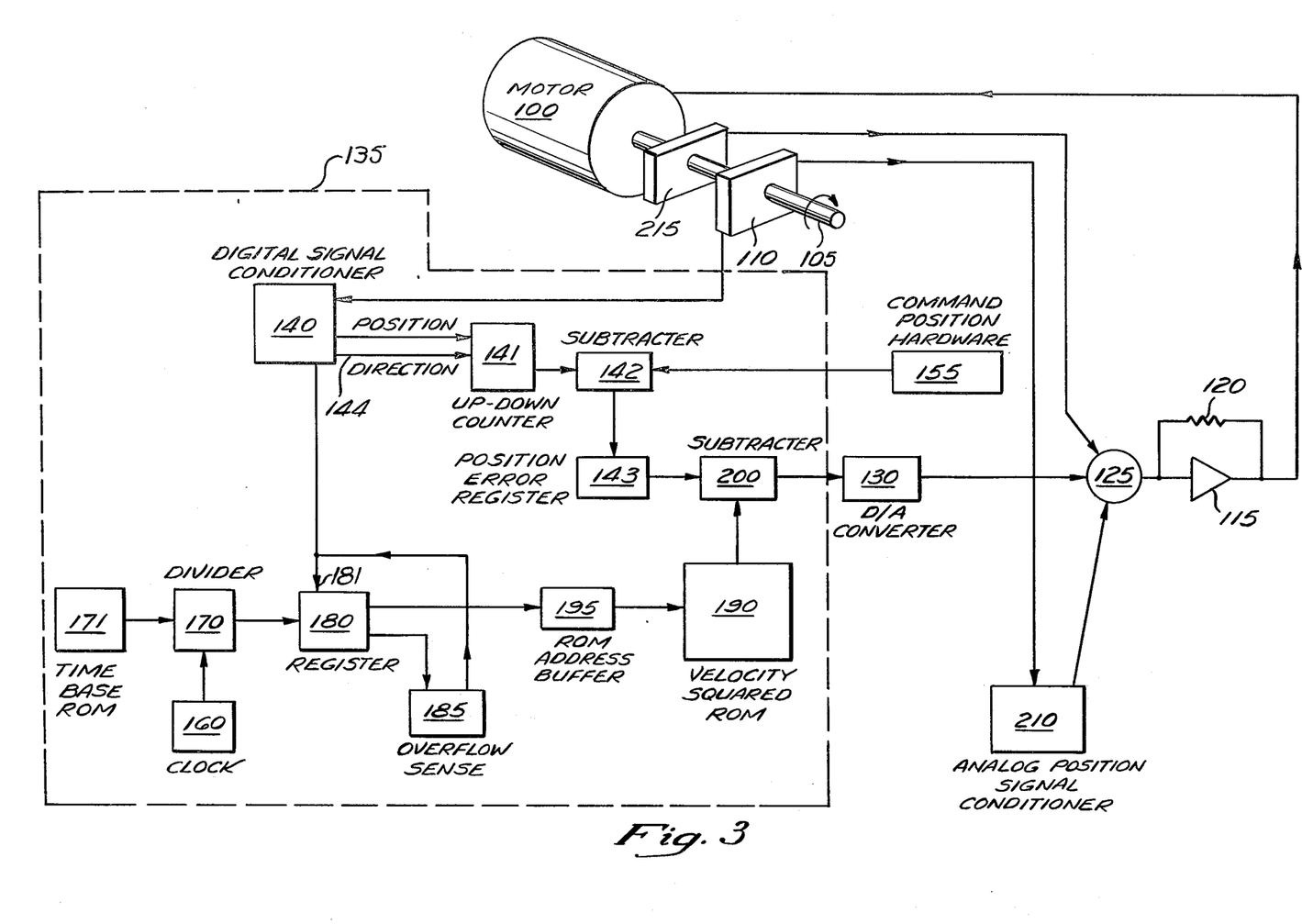
FIG. 3 is a block diagram of the digital control system and of the analog control system of this invention controlling a servo mechanism at a single servo summing node.

FIG. 3 illustrates the positioning control system of this invention in block diagram form. A servo mechanism 100, such as an electric motor, drives a shaft 105 which controls a device to be driven, such as a print wheel in a high speed printer. The shaft 105, in addition, drives a digital position transducer 110 which provides input pulsed signals for the digital feedback portion of the circuit.

In a preferred embodiment of this invention, the position transducer 110 consists of a plurality of position sensors on the shaft 105 generating a pair of signals at a rate corresponding to the angular velocity of the shaft 105. The two signals are in quadrature to one another, and their relative phase defines the direction of rotation of the shaft 105. The pair of signals is received from the position transducer 110 by the digital signal conditioner 140. The digital signal conditioner converts the signals to a position pulse output, each pulse representing a position change of the shaft 105 corresponding to the spacing of the position sensors on the shaft 105. The signal conditioner 140 also detects the direction of the rotation of the shaft 105 by sensing the relative phase of the two signals generated by the position transducer 110.

Digital electronics 135 consists of two portions, one portion calculating a position error, and the other portion generating a feedback signal based on the inverse of the velocity of the shaft 105.

In the position error portion of the digital electronics 135, the up/down counter 141 computes the position of the shaft 105 by counting the position pulses from the digital signal conditioner 140. Because the digital signal conditioner 140 detects the direction of rotation of the shaft 105, it controls the up/down counter 141 to add bit counts to the accumulated sum of bits when the direction of rotation of the shaft 105 is in positive direction, and to subtract bit counts from the accumulated sum of bits when the direction of the rotation of the shaft 105 is negative. This control is exerted by the digital signal conditioner 140 over the up/down counter 141 via the direction control line 144.

An external position command is received from the hardware 155. The position command may correspond, for example, to an ascii code character which is converted in the hardware 155 to a set of position bits. Subsequently, the computed position held in the up/down counter 141 and the position command from the external hardware 155 are combined in the subtractor 142 to generate a position error, which is then stored in the position error register 143.

In the velocity portion of the digital electronics 135, the clock 160 outputs clock pulses at a uniform frequency. The divider 170 reduces the frequency of the clock pulse and sends clock pulse output at the reduced frequency to the digital velocity counter 180. The digital velocity counter 180 dumps its contents and resets to zero count at the occurrence of each position pulse generated by the digital signal conditioner 140. This position pulse is received at the dump command input 181 to the digital velocity counter 180. If the shaft 105 is rotating in a very high speed, the number of clock pulses from the clock 160 and the divider 170 counted by the velocity 180 will be small, since the time between position pulses received at the dump command input 181 will be short. On the other hand, if the shaft 105 is rotating at a low speed, the time between position pulses generated by the digital signal conditioner 140 will be long, and consequently the velocity counter 180 will count clock pulses from the clock 160 and the divider 170 for a long time to accumulate a large count before its contents are dumped in response to the next position pulse received at the dump command input 181. Therefore, it is seen that the output dumped by the counter 180 is large when the velocity of the shaft 105 is small, and is small when the velocity of the shaft 105 is large. Therefore, the output dumped by the counter 180 is inversely proportional to the velocity of the shaft 105, and may therefore be considered to be representative of the inverse of the shaft velocity. The clock 160 therefore provides the time base computing this velocity inverse dumped by the counter 180. Furthermore, this time base is altered by the divider 170, since it effectively slows down the time base by dividing the frequency of the output of the clock 160. Considering the frequency of the clock 160 as a numerator, the divider 170 divides this frequency by a certain denominator held in the divider 170, to generate a clock signal having a slower frequency. Advantageously, this denominator may be supplied to the divider 170 by a time base read only memory (ROM) 171. The ROM 171 holds a look-up table of numbers which are a set of denominators furnished by the divider 170. A particular denominator will be furnished by the time base ROM 171 to the divider 170 when the ROM receives a particular address corresponding to the particular denominator stored in the ROM 171. This address may correspond to a hardware device address. Thus, when the inverse velocity is to be computed for a particular hardware device, the time base ROM 171 may select a particular time base corresponding to the hardware device address, which will result in a different scaling of the computation of the inverse velocity for a different hardware device address.

If the shaft 105 is traveling at a high angular velocity, the contents of the digital velocity register 180 will be very low. However, the capacity of the digital velocity register is limited, and therefore, if the shaft 105 is rotating at a very low angular velocity, it is possible that the digital velocity register 180 will overflow before the next gating pulse is received at the gate input 181 to unload the register 180. In such a case, the contents of the digital velocity register have reached a maximum value which is the inverse of the minimum velocity detectable by the digital electronics 135. If the shaft 105 is rotating slowly, the address supplied to the read only memory address buffer 195 will not change for a long time after the register 180 has overflowed. Therefore, the overflow sense switch 185 is provided on the digital velocity register 180 which generates an alternative gating command to the gate input 181 so that, as soon as the digital velocity register 180 has overflowed, the register 180 will supply a new address to the buffer 195 in the velocity ROM 190. This eliminates unnecessary delay in sensing zero velocity. Thus, it may be seen that the capacity of the digital velocity register defines a minimum velocity of the shaft 105 which may be measured by the digital electronics 135. Furthermore, it may be seen that the overflow sense switch 185 provides a means for sensing when the velocity of the shaft 105 has fallen below this minimum velocity measurable by the digital electronics 135.

As discussed above, the contents of the digital velocity counter 180 which are dumped correspond to a number which is the scaled inverse of the velocity of the shaft 105. If the velocity of the shaft 105 is V, and the time base is scaled by the divider 170 by a scaling factor K, the contents dumped from the digital velocity counter 180 is proportional to K/V. This numer, K/V, is dumped by the counter 180 to the ROM address buffer 195 of the velocity squared ROM 190. Thus, the address furnished to the velocity squared ROM 190 is K/V. The velocity ROM 190 contains a velocity squared look-up table containing numbers which are proportional to the square of the reciprocal of the number contained in the ROM address buffer 195. Thus, when the counter 180 dumps the number K/V into the ROM address buffer 195, the velocity squared look-up table will furnish a number equal to $(V/K)^2$. The velocity squared ROM 190 then sends this output, $(V/K)^2$ to a subtractor 200. The contents of the position error register 143 is also provided to the subtractor 200. The subtractor 200 subtracts the output of the velocity squared ROM 190, $(V/K)^2$, from the position error number furnished the register 143. The result is the servo control signal furnished by the digital electronics 135.

The contents of the velocity squared ROM 190 determines the shape of the velocity profile. Advantageously, the contents of the look-up table of the ROM 190 may be programmed to provide any function of velocity corresponding to any velocity profile. For example, a function of velocity exponentiated to the 2.5 power may be tabulated in the look-up table of the ROM 190 and addressed by the inverse of the velocity. Theoretically, when a straight line velocity profile is desired during deceleration under control of the digital electronics 135, the negative velocity feedback summed with the position error should be proportional to the square of the velocity. Accordingly, the output of the velocity squared read only memory 190 is supplied to the subtractor 200 where it is subtracted as negative velocity feedback from the position error supplied by the position error register 143.

As discussed above, the scaling constant K is determined by the rate of the clock 160, and the denominator furnished to the divider 170 by the time base ROM 171. Thus, because the output of the velocity squared ROM 190 is $(V/K)^2$, selection of the scaling factor K by the time base ROM 171 also scales the magnitude of the velocity squared ROM 190 supplied to the subtractor 200. Therefore, the contents of the time base ROM 171 and the hardware device address supplied to the time base ROM 171 scales the magnitude of the output of the velocity squared ROM 190. The digital electronics 135 thus permit modification of the velocity profile by programming the contents of the velocity squared ROM 190 or programming the contents of the time base ROM 171 or by changing the hardware address supplied to the time base ROM 171.

Figure 4A:
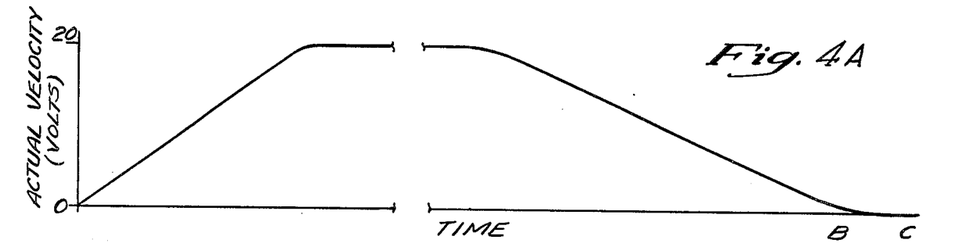
FIG. 4A is a plot of the velocity as a function of time of the servo mechanism of FIG. 3 similar to the plot of FIG. 1.
Figure 4B:
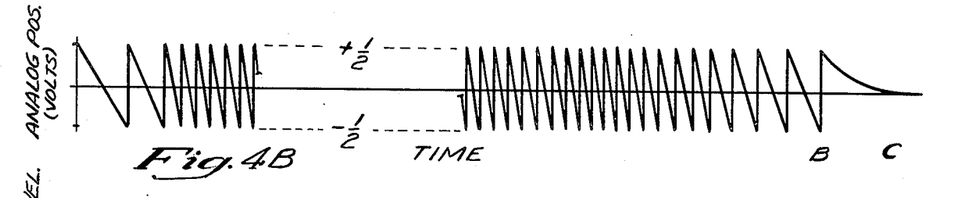
FIG. 4B is a plot of the time domain wave form of the analog position error signal generated at the servo summing node of FIG. 3.
Figure 4C:
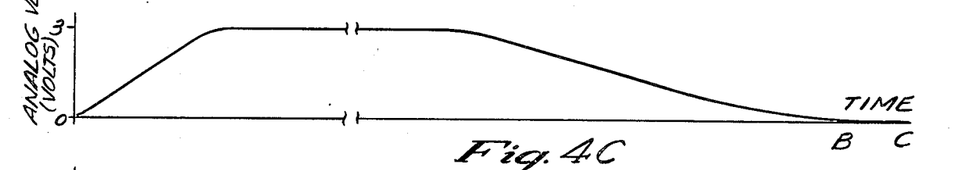
FIG. 4C is a plot of the time domain wave form of the analog velocity signal generated at the servo summing node of FIG. 3.
Figure 4D:
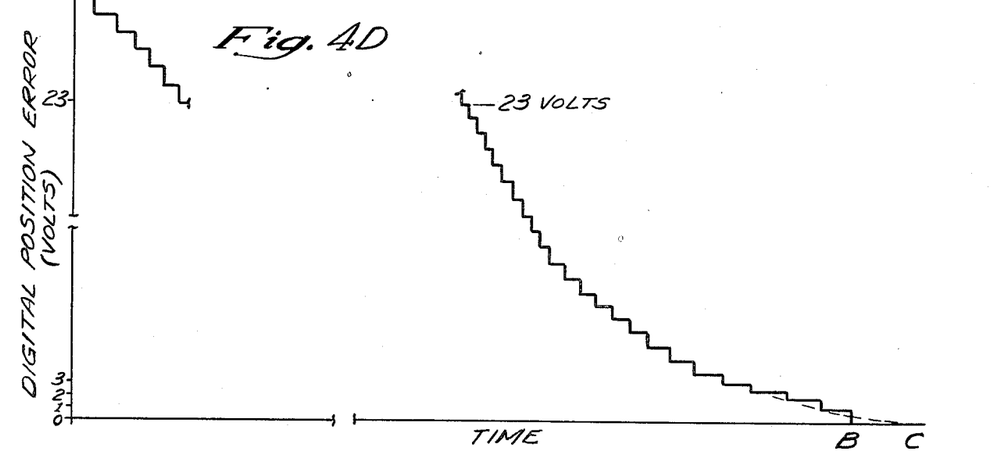
FIG. 4D is a plot of the digital position error signal computed by the arithmetic logic unit of FIG. 3 as a function of time.
Figure 4E:
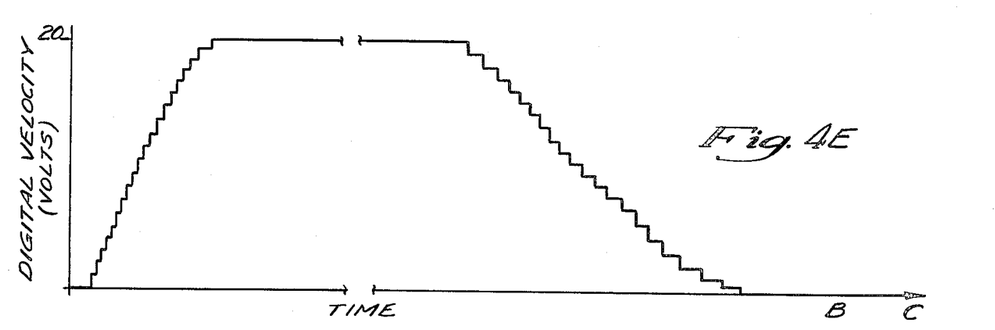
FIG. 4E is a plot of the square of the digital velocity as a function of time corresponding to the contents of the digital velocity register of FIG. 3.

Referring to FIG. 4, the contents of the position error register 143 as a function of time are illustrated in FIG. 4D. It is seen that the contents of the position error register 143 decreases as a step function according to the loss of bits in the position error register. This decrease in the position error register corresponds to a decrease in the position error as the position of the shaft 105 detected by the digital position transducer 110 approaches the commanded position generated by the position command. FIG. 4E illustrates the digital velocity feedback supplied by the velocity squared read only memory 190 as a function of time. This plot is also a step function corresponding to the different binary bits at each addressed location in the ROM 190. As the position error decreases (FIG. 4D), the velocity feedback increases to a constant level corresponding to $V_{max}$ discussed above in connection with FIG. 1.

As the digital position error plotted in FIG. 4D further decreases, it eventually reaches the same magnitude as the digital velocity feedback, at which time the digital velocity feedback begins to decrease at a constant rate. The shape of the plot of the digital velocity feedback of FIG. E is a function of the velocities of the shaft 105 achieved by the control system of FIG. 3 and of the velocity squared function defined by the contents of the velocity squared ROM 190. The magnitude of the curve of FIG. 4E depends upon the velocity scaling factor K furnished by the time base ROM 171.

The analog system of FIG. 3 is similar to analog feedback control systems well known in the prior art, and is designed to provide for very fine position control of the shaft 105.

It has been seen that the position transducer 110 consists of a plurality of sensors on the shaft 105 generating two position signals in quadrature to one another. In the analog system, these two quadrature signals are processed in the analog signal conditioner 210 to generate a signal proportional to the displacement of the rotational position of the shaft from a null point halfway between two rotational positions of the shaft 105 defined by two adjacent sensors of the plurality of sensors on the shaft 105. The ultimate desired position of the shaft 105 at its end of travel is always at one of these null points. Therefore, the output of the analog signal conditioner 210 defines the position error of the shaft 105. Because there are many position sensors located on the shaft 105, there is an equal plurality of null points on the shaft 105 which will be sensed by the analog signal conditioner 210 during each complete rotation of the shaft 105. Thus, the output of the analog signal conditioner 210 will be repetitively periodic over one complete rotation of the shaft 105.

FIG. 4B is a plot of the time domain wave form of the analog position error. This position error is seen to be a rapid sawtooth wave form which is periodic over many cycles during small movements of the shaft.

The analog position signal conditioner 210 senses continuous position error with respect to each null point. Therefore, the analog position signal conditioner 210 defines a ramp function between each digital position pulse of transducer 110. It can be seen that if the analog position error time domain wave form of FIG. 4B is superimposed on the digital position error time domain wave form of FIG. 4D, a smooth ramp function results. The superposition of these two wave forms and the resulting ramp function is illustrated in the dotted line of FIG. 4D. Thus, simultaneous control by the digital and analog system's results in an overall smoother operation of the positioning control system. The amplitude of the analog position error signal is small compared to the digital position error signal whenever there is substantial position error because the analog position signal conditioner 210 has a very small output corresponding to the small distance of shaft movement over which the output of the transducer 210 is periodic.

The analog velocity transducer 215 outputs a continuous signal proportional to the angular velocity of the shaft 105. The transducer 215 may be, for example, an analog velocity tachometer. The tachometer 215 is sensitive so that it may measure very small velocities. Therefore, its maximum velocity is limited according to the sensitivity. For example, in a preferred embodiment of this invention, the analog velocity transducer 215 has a maximum output equivalent to the voltage generated by the digital electronics 135 when there is a position error corresponding to three digital position bits of the digital transducer 110.

Inspection of the plot of FIG. 4C, which is the time domain wave form of the analog velocity output of the transducer 215, shows that the analog velocity transducer 215 is saturated during most of the time that the control system is operating and its output is insignificant compared to the digital position error signal and the digital velocity signal until the position error is close to zero, at which time the summation of the analog velocity and the analog position error predominately controls the voltage supplied to the amplifier 115. At this time, the velocity profile is seen to be an expontential decay function, and the servo command is reduced by an ever-decreasing analog velocity negative feedback signal which causes the exponential decay curve. This exponential curve is located between time B and time C in all of the plots of FIG. 4.

As is apparent from FIGS. 4A through 4E, the transition from the control of the servo mechanism 100 by the digital electronics 135 to control by the analog system occurs during a finite interval of time, and is completed at time B.

Figure 5:
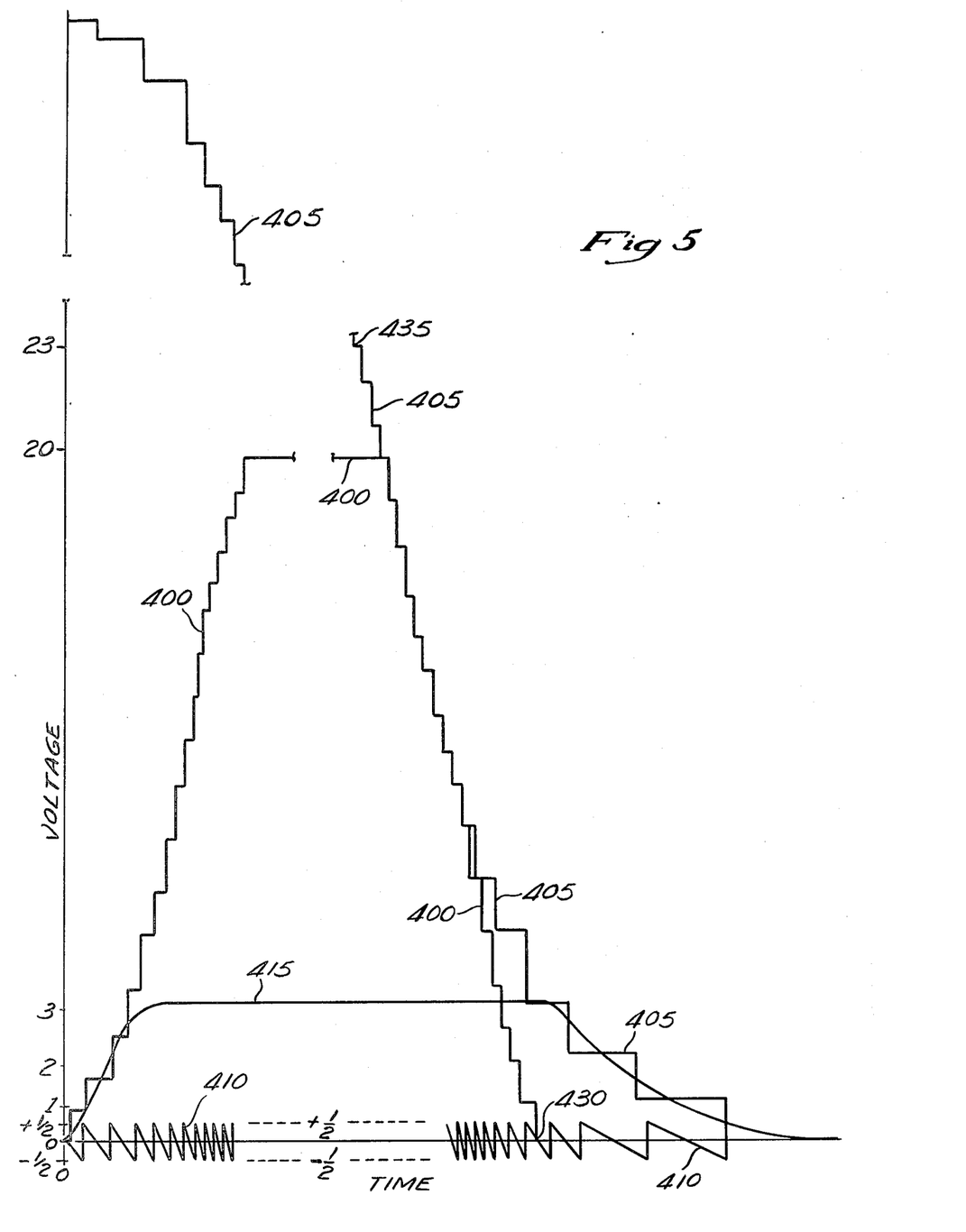
FIG. 5 is a superimposed plot of all of the analog and digital signals input to the servo summing node of FIG. 3 as a function of servo mechanism position.

The feedback signals of FIGS. 4B, C, D, and E are shown together in one plot of FIG. 5. The purpose of FIG. 5 is to plot the summing of the feedback signals in the summing node 125. Each of the signals shown in FIG. 5, the digital velocity signal 400, the digital position error signal 405, the analog position error signal 410, and the analog velocity signal 415, are shown separately. These signals are plotted in volts where one volt is equated by the digital to analog converter 130 to one digital bit. A significant feature of the invention is that the analog and digital signals are all summed together on one summing node 125, shown in FIG. 3. In the exemplary control system plotted in FIG. 5, the system is constrained to have a maximum velocity corresponding to 20 volts. The minimum velocity at which the digital velocity register 180 overflows is selected to correspond to three volts on the summing node 125. As a result, the digital position error 405 is nulled out on the summing node 125 by the digital velocity 400 at position 435. The selection of these constraints is important to insure a smooth transition between digital control and analog control. Specifically, FIG. 5 shows that when the digital position error 405 equals three volts, the system is designed so that the digital velocity has reached zero, and therefore no longer provides a velocity feedback which nulls the digital position error feedback. However, it will be remembered that the analog velocity feedback 415 saturated at three volts, and therefore now provides the necessary velocity feedback to offset the digital position error 405. While the digital position error 405 is substantially followed by the velocity during the remaining rotation of the shaft 105 until it falls below 1 volt, the analog position error 410 continues to provide a voltage periodically alternating between one-half and minus a half-volt on the summing node 125, resulting in a continually decaying command signal to the servo mechanism 100. The command decreases as the analog position error 410 approaches zero and the analog velocity 415 approaches zero.

Figure 6:
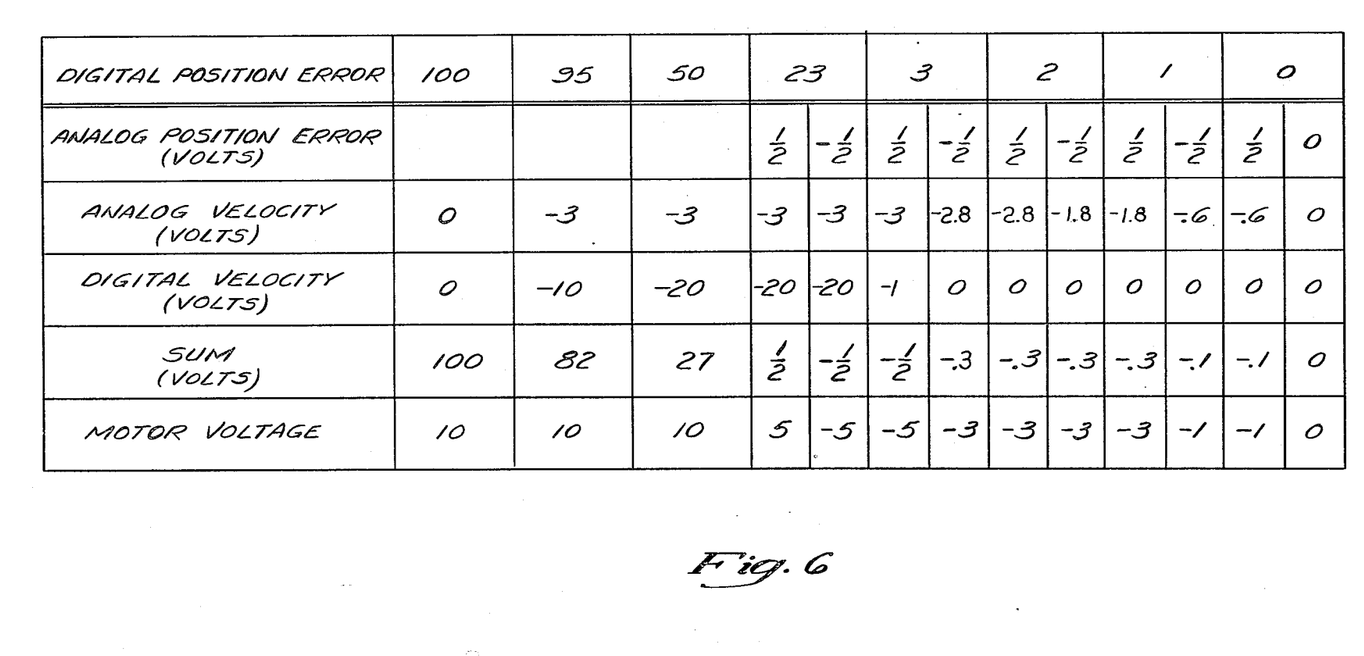
FIG. 6 is an exemplary table of the values of the analog position error, the analog velocity, the digital velocity, the digital position error, and the resulting summation value at the servo summing node and the voltage supplied to the servo motor corresponding to the superimposed plot of FIG. 5.

FIG. 6 is an exemplary chart of the signals plotted in FIG. 5 showing possible successive computations of the voltage sum appearing on the servo summing node 125 for possible successive values of the digital position error 405, the analog position error 410, the analog velocity 415, and digital velocity 400. The motor voltage is also computed, where the gain of the amplifier 115 is assigned a value of 10. The further constraint is applied that the upper value of the voltage applied to the servo mechanism 100 is 10 volts. In the chart of FIG. 6, the distance from position A to position C is assigned the value of 100 bits corresponding to 100 volts. Thus, it follows that when the digital position error is 100 bits, the voltage sum on the servo summing node 125 is 100. Because of the voltage limitation specified above, the voltage supplied to the motor at this time is 10 volts. When the digital position error has decreased to 50 volts, the digital velocity has increased to the maximum velocity of 20 volts, while the analog velocity transducer is saturated at 3 volts and the analog position sensor produces an alternating voltage of plus and minus a half-volt. Adding all the position errors on the summing node 125 and subtracting all the velocities, the resulting sum is approximately 27 volts. Again, the result is the maximum voltage of 10 volts applied to the servo mechanism 100. Significantly, when the digital position error is 23 volts, the velocity feedback of the digital velocity transducer output of 20 volts and the saturated analog velocity transducer output of 3 volts acts to null out the digital position error with the result that the analog position error controls the sum of the servo summing node 125. Because of the ramped function of the analog position error, the sum changes from one-half volt to minus one-half volt during the period of time that the digital position error is 23. Thus, the voltage supplied to the servo mechanism 100 decreases from 10 volts to 5 volts and then to minus 5 volts due to the ten-fold amplifier 115 gain. At this time, the transition from digital control to analog control is beginning to take place, and both the analog and digital control systems are making equally significant contributions to the sum appearing on the servo summing node 125. Also at this time, it is seen that the command signal makes a general transition from a positive voltage to a generally negative voltage, although some positive overshoot may occur during this transition, as shown in FIG. 5. This defines the point at which the system begins to brake the motion of the motor.

When the digital position error equals 3 volts, it is seen that the digital velocity drops to zero as a result of the limited capacity of the digital velocity register 180, discussed above. Thus, in this example, the system is designed so that when the digital position error is 3, the control system has braked the actual velocity below the minimum value which is measurable by the digital electronics 135. However, the digital position error, in the absence of the digital velocity feedback, is followed by the analog velocity feedback which has a saturated value of 3 volts. Subsequently, the voltage supplied to the servo mechanism 100 decreases from minus 5 to minus 3 volts. As the digital position error decreases to zero bits, the anlog system assumes exclusive control of the servo mechanism 100, and the analog position error progresses from one-half volt to zero.

It should be recognized that the point 430 in FIG. 5 at which the digital velocity becomes zero and the point 435 at which the digital position error is approximately equal to the velocity feedback may be selectively changed with respect to the servo position in the example given in the chart of FIG. 6 by selecting different values for the maximum velocity of the control system, or a different value for the saturation level of the analog velocity transducer 215''. The two points 430,435 define the extent of the region in which the transition between digital control and analog control takes place.

It is seen that the transition between digital and analog control takes place over a selected region and is automatic and therefore requires no special switching control to be added to the system. Furthermore, both the analog and the digital control system continuously supply their inputs to the servo summing node 125. Thus, the invention utilizes in one control system the advantage of the digital control system in supplying a linear velocity profile and the advantage of the analog system near servo end-of-travel in supplying a non-linear velocity profile having an exponential decay and the fine and continuous control. The digital and analog systems are thus integrated to derive maximum advantage from each.

Figure 7:
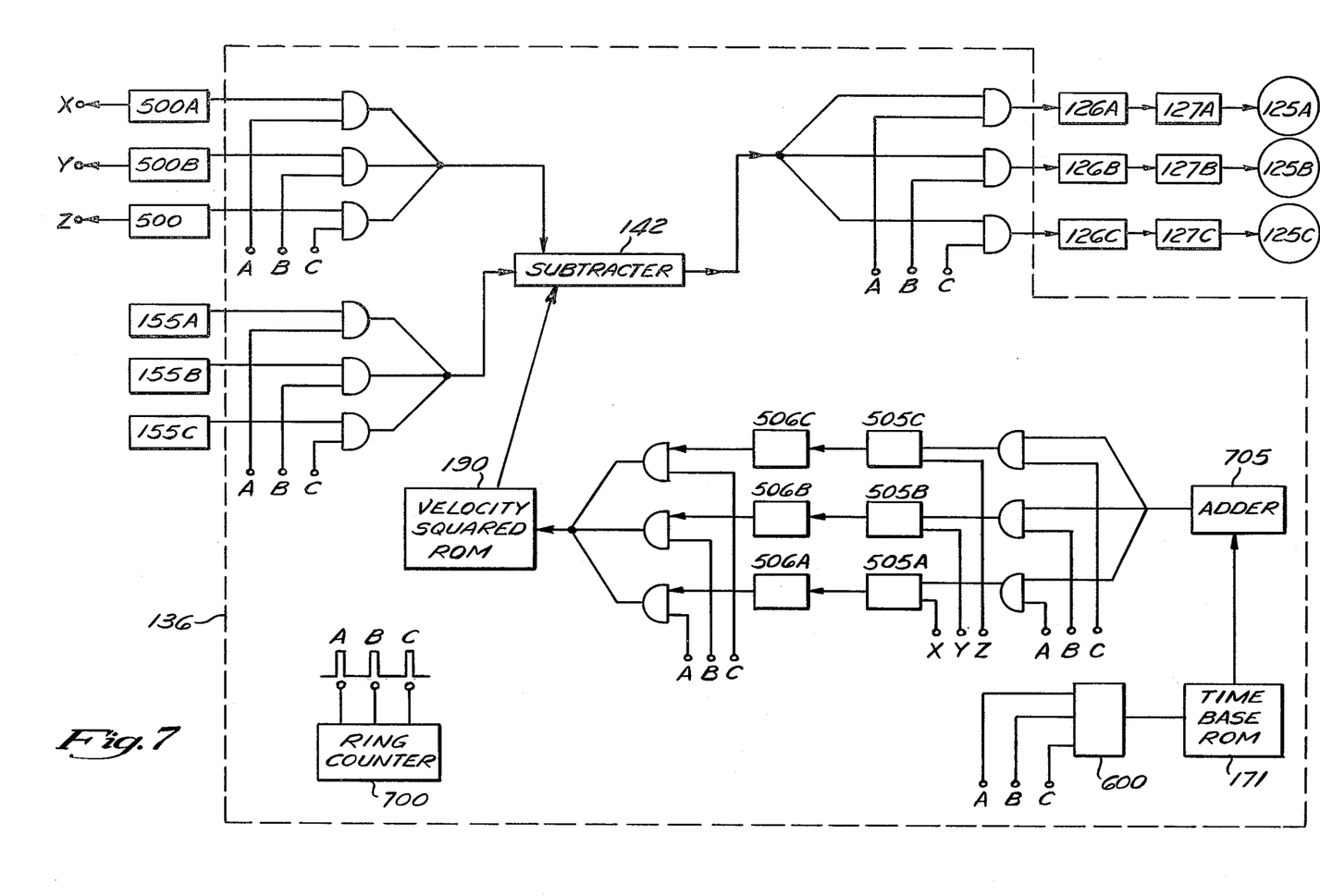
FIG. 7 is a simplified schematic diagram indicating one method of multiplexing the digital control system of FIG. 3 with three servo mechanisms and analog control systems.

FIG. 7 illustrates an alternative embodiment of the system in which the digital electronics 136, similar to the digital electronics 135 of FIG. 3 is multiplexed or time shared in three separate systems. Each of these systems includes a summing node 125 communicating with a summing node holding register 126 through a digital-to-analog converter 127, position command hardware 155 and digital position computation and storage hardware 500. The hardware 500 includes the position transducer 110 and the signal conditioner 140 shown in FIG. 3. A ring counter 700 is included in the digital electronics 136 and provides three serially clocked output pulses a, b, and c each of which causes the digital electronics to interface with a different one of the three systems. Each of the holding registers 126a, 126b, 126c, the position command hardware 155a, 155b, 155c and the digital position computation and storage hardware 500a, 500b, 500c are gated, in turn, by the ring counter 700 to communicate with the digital electronics 136. Preferably, the clock rate of the ring counter is much greater than the rate at which digital position is changed in the hardware 500.

The position command hardware 155a is clocked by ring counter pulse a and sends a position command to the subtractor 142. At the same time, ring counter pulse a gates position computation hardware 500a to the subtractor 142. The subtractor 142 then calculates the digital position error.

The multiplexed system illustrated in FIG. 7 computes the inverse of velocity using different hardware than the hardware discussed in connection with the digital electronics in FIG. 3. An adder 705 is gated to the velocity storage 505a by ring counter pulse a, which causes the adder 705 to add a number furnished by the time base ROM 171 to the contents of the velocity storage register 505a. The number furnished by the time base ROM 171 is addressed by a ROM address encoder 600, which supplies an address to the time base ROM 171 by encoding the ring counter clock signals a, b and c to form an address. Preferably, the number contained in the time base ROM 171 accessed by the ROM address encoder 600 during ring counter pulse a is proportional to the time period of the successive ring counter pulses a.

Unloading of the storage hardware 505 is gated by digital position change signals x, y, and z from the hardware 500a, b, c respectively. The contents of velocity storage 505a are dumped into storage 506a when storage 505a senses the digital position change signal x from the hardware 500a. The digital change signal also causes the storage 505a to reset its contents to zero. Thus, it is seen that the contents of storage 506a is changed at the relatively infrequent occurrence of the digital position change signal x. In the meantime, the very rapid ring counter pulses a cause the contents of storage 506a to address the velocity squared ROM 190 many times between position change signals x. The contents of storage 506a are preserved until the occurrence of the next digital position change signal x. As discussed before in connection with FIG. 3, addressing of the velocity squared ROM 190 causes a number which is proportional to the reciprocal of the square of the address to be furnished to the subtractor 142 from the ROM 190. The subtractor subtracts the digital position furnished by the hardware 500a and the velocity squared number furnished by the ROM 190 from the position command furnished by the hardware 155a. The result is gated from the subtractor 142 by ring counter pulse a to holding register 126a.

The time between digital position change signals x is inversely proportional to the velocity of the servo mechanism controlling the hardware 500a. The adder 705 generates a measured value of this time interval by incrementing the contents of storage 505a with a time base constant supplied by the ROM 171 at the occurrence of each ring counter pulse a. The contents are dumped and reset at the occurrence of each position change signal x. Thus, the contents dumped from storage 505a to storage 506a is proportional to the inverse of velocity, 1/v. The constant supplied by time base ROM 171 may be modified to provide a different time base for computing a scaled value of the inverse of velocity. If the time base is thus scaled by a scaling factor k, the contents of storage 505a which is dumped to storage 506a is proportional to k/v. The quantity k/v stored in storage 506a is used to address the velocity squared ROM 190. As discussed above in connection with FIG. 3, the velocity squared ROM 190 contains a look up table of numbers proportional to the reciprocal of the square of the address read from the storage 506a. Therefore, the velocity squared ROM 190 furnishes a number proportional to $(k/v)^2$.

The ROM address decoder 600 addresses the time base ROM 171 to select a particular time base constant to be furnished to the adder 705. The address decoder 600 decodes the clock signals a, b, and c received by the decoder to furnish an address to the time base ROM 171. Preferably, at ring counter pulse a, the ROM address decoder 600 will cause the time base ROM 171 to furnish a time base constant which will scale the calculated inverse of velocity according to the particular characteristics of the servo mechanism time shared during ring counter pulse a. This time base constant is proportional to the time scaling factor k. It has been seen that the output of the velocity squared ROM 190 is proportional to $(v/k)^2$. Therefore, selection of a different address by the decoder 600 results in a change in k, and, therefore, a change in the number provided by the ROM 190.

The purpose of the velocity squared ROM 190 is to provide a velocity feedback to the subtracter 142 in order to achieve a desired velocity profile. This velocity profile may be modified by changing the contents of the velocity squared ROM 190. The contents of the velocity squared ROM 190 determines the shape and magnitude of the velocity profile provided by the control system of FIG. 7. Programming the contents of the time base ROM 171 controls the time base scaling factor k which determines the slope of the velocity profile. Further control of this time base scaling factor k is provided by the ROM address decoder 600 which addresses different numbers from the time base ROM 171.

Therefore, addressing by the ROM address decoder 600, and programming of the time base ROM 171 provides additional means for controlling the velocity profile provided by the control system of FIG. 7.

It is seen that the use of a digital control system permits the multiplexing and control of a plurality of servo systems by one digital control system. For example, one servo system would control a printer carriage, a second servo system would control a print wheel on the carriage, and a third servo system would control the paper platen, each servo system providing the unique feedback required for the mechanical-characteristics of the control device.

Thus, it is seen that the invention provides a digital feedback servo loop and an analog feedback servo loop, both loops always sending control signals to a single summing node in a servo control system. Because the digital feedback loop is easily adapted for controlling position over long distances of travel and the analog feedback loop is adapted to provide fine positioning control over short distances, the invention provides in a single servo control system fine positioning control of a device moving over long distances. In the absence of the analog feedback loop, the digital feedback loop would have to be adapted to provide for the very fine positioning control otherwise provided by the analog feedback loop. The result would be that for very high velocities, the digital feedback loop would generate feedback signals at impractically high frequencies, making such a system impractical for controlling position over long distances traveled at high speed by a device requiring very fine positioning control at its end of travel, such as the carriage or print wheel of a high speed printer. Thus, it is seen that the problem of providing very fine positioning control for very long distances of travel in a single servo mechanism useful in a high speed printer are solved by this invention.

I claim:

1. A positioning control system for controlling a positioning mechanism within a control range, comprising:
   a digital feedback control system generating a digital position error input signal for coarse control of said positioning mechanism;
   an analog feedback control system generating an analog position error input signal to said positioning mechanism, said analog position error signal varying periodically with distance, the period of said variation being short in comparison with said control range of said servo system, said analog position error input signal having a peak periodic amplitude which is small in comparison with the amplitude of said digital position error signal except when said servo system is within a predetermined distance from a desired location, and thus, providing fine control of said positioning mechanism; and
   said digital and analog feedback control systems providing continuous and simultaneous feedback to control said positioning mechanism.

2. A positioning servo control system comprising:
   a digital feedback control system generating continuous input signals to said positioning mechanism;
   first means in said digital control system for measuring only large velocities and large position errors above a minimum velocity and a minimum position error respectively;

second means in said digital control system for providing coarse positioning control;

an analog feedback control system generating continuous input signals to said positioning mechanism;

third means in said analog control system for measuring only small velocities and small position errors up to a maximum velocity and a maximum position error respectively;

fourth means in said analog control system for providing fine and continuous positioning control;

said positioning mechanism responding continuously to said input signals simultaneously from said digital and analog systems; and said minimum position error greater than said maximum position error and said minimum velocity greater than said maximum velocity to define a region of transition between control by said digital system and control by said analog system.

3. A positioning feedback control system for controlling a drive mechanism having an adjustable velocity profile, comprising:

first means for determining a position error;

second means for computing a first function of the velocity of said servo mechanism;

memory means for storing a plurality of numbers addressable to define a second function of velocity;

third addressing means for applying said first computed function to address one of said addressable numbers in said memory means; and summing means for combining said position error and said one addressed number.

4. A positioning control system, as defined in claim 3, further comprising:

fourth means for changing the contents of said memory means.

5. A positioning control system, as defined in claim 3, wherein said function of velocity computed by said computing means is proportional to the reciprocal of the velocity.

6. A positioning control system, as defined in claim 5, wherein said means for computing comprises:

means for sensing a change of position of said drive mechanism;

means for computing the time interval between changes of position sensed by said first position error determinator means; and means furnishing the time interval computed by said second means to said addressing means.

7. A positioning control system, as defined in claim 3, further comprising means for modifying said function of the velocity computed by said computing means.

8. A positioning control system, as defined in claim 6, further comprising means for scaling said function of the velocity computed by said computing means, said scaling means comprising means for scaling the time interval computed by said second computing means.

9. A positioning control system, as defined in claim 8, wherein said scaling means comprises:

read only memory means storing a set of time base constants, each of said constants accessed by a unique hardware address;

address buffer means furnishing a hardware address to said second memory means to access a particular increment constant;

storage means;

adding means for periodically incrementing said storage means by said particular increment constant; and means for outputting the contents of said storage means to said furnishing means in response to said sensing means.

10. A positioning control system as defined in claim 9 further comprising means for arbitrarily programming the contents of said second memory means.

11. A positioning control system having an adjustable velocity profile for controlling a drive mechanism comprising:

means for computing position error;

means for sensing changes of positions of said servo mechanism;

first memory means storing a first look-up table of first numbers each defining a velocity scaling factor;

first address means for accessing a particular one of said first numbers according to a selected address;

register means having its contents periodically incremented at a rate determined by said particular first number, said register means providing a signal inversely proportional to the rate of occurrence of position changes sensed by said sensing means;

second memory means storing a second look-up table of second numbers each defining a function of said inversely proportional signal;

second addressing means for accessing a particular one of said second numbers in said second memory means according to an address comprising said inversely proportional signal;

means for periodically providing said inversely proportional signal to said second addressing means; and summing means for combining said position error and said accessed particular second number to form a servo command.

12. A positioning control system as defined in claim 11 wherein said velocity profile provided by said position control system is adjustable.

13. A positioning control system as defined in claim 12 wherein said velocity profile is adjustable by changing the contents of said first memory means.

14. A positioning control system as defined in claim 12 wherein said velocity profile is adjustable by changing the contents of said second memory means.

15. A positioning control system as defined in claim 12 wherein said velocity profile is adjustable by changing said selected address furnished to said first addressing means.

16. A positioning control system for controlling a servo mechanism, comprising:

an analog feedback control system having means producing a continuous position error feedback signal which is periodically repetitive over a first small position error and means producing a continuous velocity feedback signal saturated above a first small velocity;

a digital feedback control system comprising means producing a digital position error feedback signal for large position errors but producing zero signal below a second small position error, and means producing a digital velocity feedback signal for large velocities, but producing zero signal below a second small velocity;

said digital system dominating control of said positioning control system for large position errors and large velocities greater than said first small position error and said first small velocity respectively;

said analog system providing the dominant velocity feedback in said positioning control system for velocities near and below said second small velocity, and providing the dominant position error feedback in said positioning control system near and below said second small position error;

said analog and digital systems both simultaneously providing digital and analog position error signals and digital and analog velocity signals combined together in said positioning control system to produce a single combined command signal to said servo mechanism; and said first and second small position errors and said first and second small velocities defining a region of gradual transition between dominant control by said digital system and dominant control by said analog system.

17. A positioning control system as defined in claim 16 wherein:

said first small position error corresponds approximately to a control signal representative of said second small position error, the velocity of said servo mechanism controlled to be at said first small velocity whenever the position error of said servo mechanism generates a control signal corresponding approximately to said second small velocity.

18. A positioning control system as defined in claim 16 further comprising:

means constraining the velocity of said servo mechanism to a maximum velocity.

19. A positioning control system as defined in claim 16 wherein said positioning control system first generally provides deceleration command signals to said servo mechanism when said digital position error approximately equals the sum of said digital velocity signal and said second small velocity.

20. The positioning control system of claim 16 wherein said first and second small positions and said first and second small velocities are each independent of one another and may be arbitrarily selected individually to define any region of transition between control by said digital system and control by said analog system.

21. A servo control system, comprising:

an analog position servo loop providing an analog position error feedback signal, said analog position signal varying periodically with distance, the period of said variation being short in comparison with said control range of said servo system, said analog position error input signal having a peak periodic amplitude which is small in comparison with the amplitude of said digital position error signal except when said servo system is within a predetermined distance from a desired location, and thus, providing fine control of said positioning mechanism;

a digital position servo loop providing a digital position error feedback signal for coarse control of said positioning mechanism; and means combining said analog and digital position servo loops to simultaneously provide servo control.

22. A servo control system, comprising:

a velocity profile control device storing plural desired velocity command signals; and means for addressing said plural desired velocity command signals of said control device in accordance with a measured inverse function of the velocity of said servo control system.

23. A motion control servo system, comprising:

a first digital position feedback loop;

a second digital velocity feedback loop;

a third analog position feedback loop;

a fourth analog velocity feedback loop; and means combining the outputs of said first, second, third, and fourth loops to provide a second output signal, said means responsive primarily to said first and second loops at high speed and responsive primarily to said third and fourth loops at low speed, the response transition of said combining means from said first to said third loop occurring at a different speed than the transition from said second to said fourth loop.

* * * * *